WITNESSES:
Bernard R. Gegauf
James F. Young

INVENTORS
Leonard C. Vercellotti &
Richard J. Madden.
BY E. F. Possessky
ATTORNEY United States Patent Office
3,440,613
Patented Apr. 22, 1969

3,440,613

INTERFACE SYSTEM FOR DIGITAL COMPUTERS AND SERIALLY OPERATED INPUT AND OUTPUT DEVICES

Leonard C. Vercellotti, Verona, and Richard J. Madden, Pittsburgh, Pa., assignors to Westinghouse Electric Corporation, Pittsburgh, Pa., a corporation of Pennsylvania Filed Mar. 25, 1966, Ser. No. 537,522
Int. Cl. G06f 3/10
U.S. Cl. 340—172.5 12 Claims

ABSTRACT OF THE DISCLOSURE

Input and output buffer storage is commonly provided by a thyristor register during interfacing operations between a teletypewriter and a computer. Electronic transfer of character bits between the register and the teletypewriter is performed serially under the control of a gated unijunction transistor oscillator.

BACKGROUND OF THE INVENTION

The present invention relates to interface systems and more particularly to digital computer interface systems arranged to provide two-way data transfer between the computer and relatively slowly functioning and serially operated input and output devices such as teletypewriters or other communication devices.

Serially operated peripheral devices function at a rate which is much slower than the operating rate of a computer, and interfacing is accordingly required for two-way data transfer between the computer and the peripheral equipment. The interfacing arrangement provides the data coupling function between the asynchronous systems by serial to parallel and parallel to serial data conversions.

As an example, the input or output apparatus may be a communications device such as a teletypewriter which operates in accordance with the standard eight bit ASCII code to process ten characters per second. Each character requires eight data bits and a start bit and two stop bits, and the bit process rate is thus one bit every 9.09 milliseconds. In contrast, a typical computer to which the teletypewriter is to be coupled may process input or output words at the rate of one every 25 microseconds. Computer input interfacing therefore requires conversion of successive serial teletypewriter bits to parallel data words in a buffer register as well as a means for interrupting the computer and transferring data words to the computer as successive input buffer registrations are completed. Similarly, computer output interfacing requires parallel to serial conversion of output data words in the buffer register as well as a means for interrupting the computer and transferring data words to the buffer register as successive output data words are transmitted.

Interfacing for devices such as teletypewriters has often been provided by mechanical selectors and distributors in combination with electronic buffer circuitry. More reliable fully electronic or fully solid state circuitry has also been used, but known interfacing circuit combinations generally are excessively expensive and complicated for many applications even though they may be entirely justified in order to meet operating specifications in other applications. In particular, interface bit timing commonly is clocked by a crystal or otherwise expensively controlled oscillator whereas teletypewriter or similar interfacing can be achieved without the use of such precision. Further, input and output interfacing typically is realized with separate buffer register arrangements whereas it is economically desirable that a substantially single and economic buffer register be commonly employed in the computer input and output interfacing operations.

SUMMARY OF THE INVENTION

In accordance with the broad principles of the present invention, an interface system comprises a buffer or storage register and preferably a thyristor buffer register which has input and output circuits provided for synchronously clocked data transfer to and from one or more relatively slowly and serially operated peripheral devices such as teletypewriter or other communication devices. A clock system provides the timing signals and preferably includes a gated unijunction transistor oscillator which operates for a predetermined time period each time it is gated. Two-way data transfer is also provided between the buffer register and a computer or similar device by additional input and output circuits. Control circuitry initiated by either the computer or the peripheral device determines whether the interface system operates in the output mode or the input mode and controls the operation of the gated oscillator. Economic and efficient interfacing stems from the common usage of the buffer register for computer inputting and outputting operations and from the cooperative usage of the synchronizing gated oscillator.

It is therefore an object of the invention to provide a novel interface system for digital computers and serially operated input and output devices which can be manufactured and operated with improved economy and efficiency.

It is another object of the invention to provide a novel interface system for digital computers and serially operated input and output devices which employs a common buffer register for data inputting and outputting with resultant data transfer efficiency and improved manufacturing and operating economy.

It is an additional object of the invention to provide a novel interface system for digital computers and serially operated input and output devices which employs a gated unijunction transistor clock oscillator with resultant data transfer efficiency and improved manufacturing and operating economy.

A further object of the invention is to provide a novel system for interfacing a computer and a teletypewriter wherein a single thyristor buffer register is clocked by a unijunction transistor oscillator to result in efficient two-way data transfer with improved manufacturing and operating economy.

These and other objects of the invention will become more apparent upon consideration of the following detailed description along with the attached drawings:

DESCRIPTION OF THE PREFERRED EMBODIMENT

Figure 1:
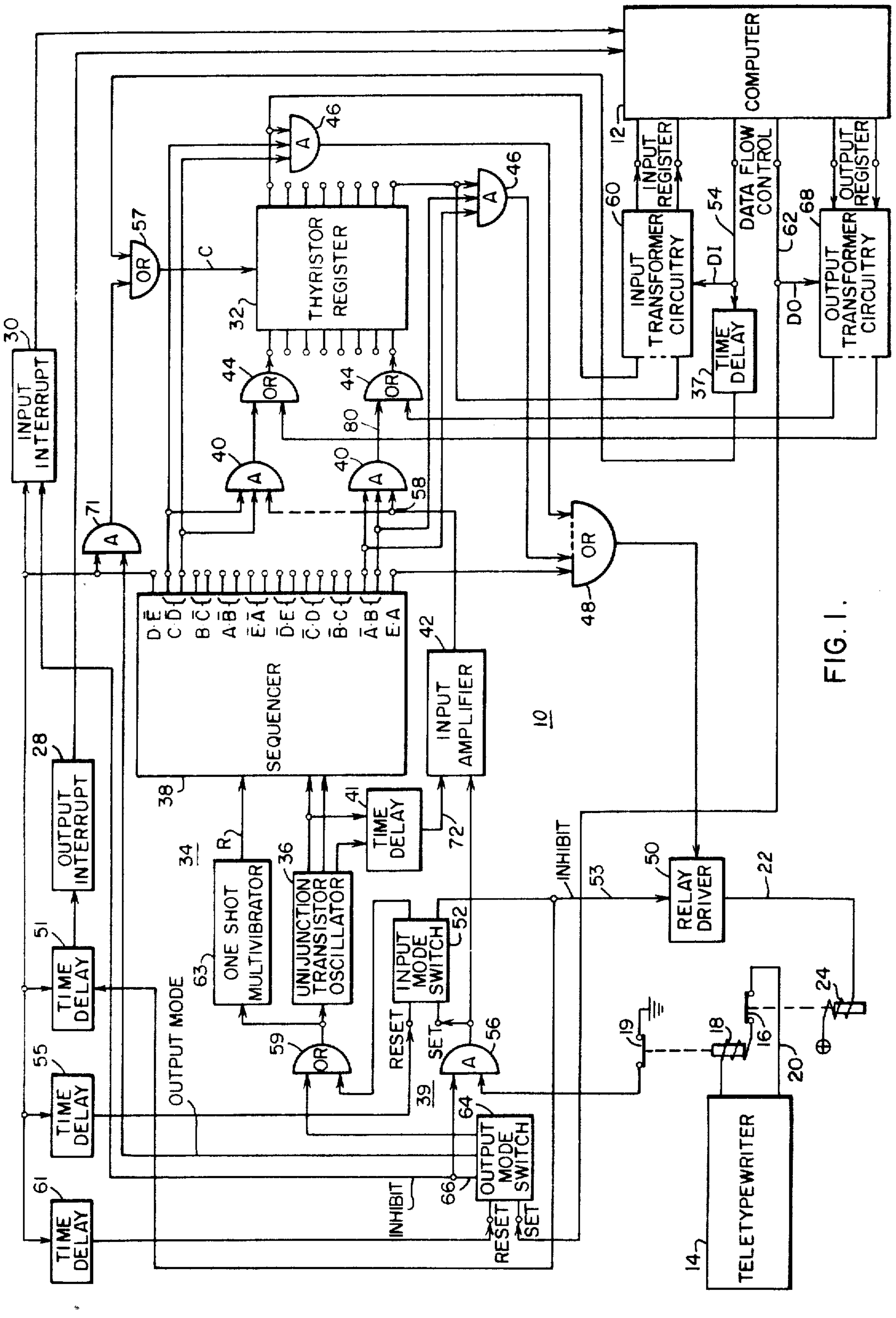
FIGURE 1 shows a block diagram of an interface system arranged in accordance with the principles of the invention.

More specifically, there is shown in FIG. 1 an interface system 10 arranged to provide two-way data transfer between a digital computer 12 and a slower serially operated peripheral device such as a communications device in the form of a teletypewriter 14. A single teletypewriter unit may be used for data inputting and outputting, or separate units can be used if desired.

The teletypewriter 14 generates data for computer input through an input coupling circuit including for example a coil of a relay 18 connected in series with a contact 16 in a line 20. The teletypewriter 14 can generate coder characters by various means, such as by paper tape reader or by keyboard. Data transfer from the computer 12 for teletypewriter printout can be effected through an output coupling circuit including a line 22 in which there is connected a coil of another relay 24. The contact 16 in the line 20 is operated by an outputting relay 24.

Figure 4:
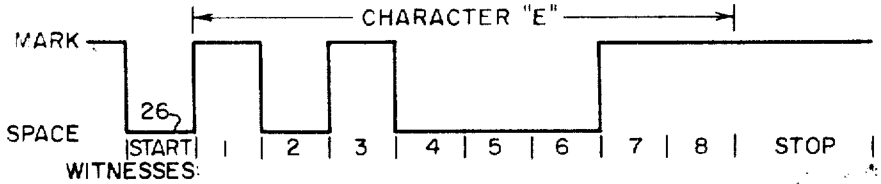
FIG. 4 shows the standard ASCII bit code for a typical teletypewriter character.

In FIG. 4, the standard ASCII teletypewriter bit code for the character E is shown to illustrate one form in which data can be processed by the interface system 10. The line 20 normally carries current, and at the start of the character transmission time period the line current is interrupted or spaced to provide a start signal as indicated by the reference character 26. The next eight bit times are either marked or spaced according to the character code. For the character E, the second and fourth through sixth bit times are spaced. To signify the end of a character transmission, the line is marked for the last two bit times in the character word time. Each bit time has a duration of 9.09 milliseconds.

The computer 12 conventionally includes an input register which accepts data as it becomes available for use in the programmed computer operation. Similarly, an output register is conventionally provided in the computer 12 to hold output data until the interface circuitry is ready to accept it. Input and output interrupt circuits 30 and 28 respectively signal the computer 12 in a well known manner when a data word is ready for inputting or when the output circuitry is ready for a data word output. Further, internal computer circuitry is suitably and conventionally arranged to effect input or output data transfers to or from the computer 12 after an input or output computer interrupt has been generated.

Input or output interface operating mode selection is achieved by control circuitry 39 which forms a part of the interface system 10. The input mode is identified by the circuitry 39 when a current interruption occurs in the line 20 with the output mode inhibited. The output mode is identified by the circuitry 39 when an output data transfer is made from the computer 12 to the interface system 10.

A single buffer register 32 provides temporary data word storage during data inputting and data outputting interface operations. Relatively minimal hardware duplication is thus realized for manufacture and use economy. Data is clocked into the buffer register 32 from the teletypewriter 14 and into the teletypewriter 14 from the buffer register 32 under the control of a gated clock system 34. Preferably, the clock system 34 includes a multi-state electronic sequencer 38 driven by a gated unijunction transistor oscillator 36.

Unijunction transistor oscillators typically operate with about one percent time error between successive timing pulses, but such error is limited to accumulation within each gated period of oscillator operation and is tolerable for the word length associated with the teletypewriter 14. A unijunction transistor oscillator is thus preferred for system clocking since circuit economy is realized within required circuit performance standards.

Figure 3:
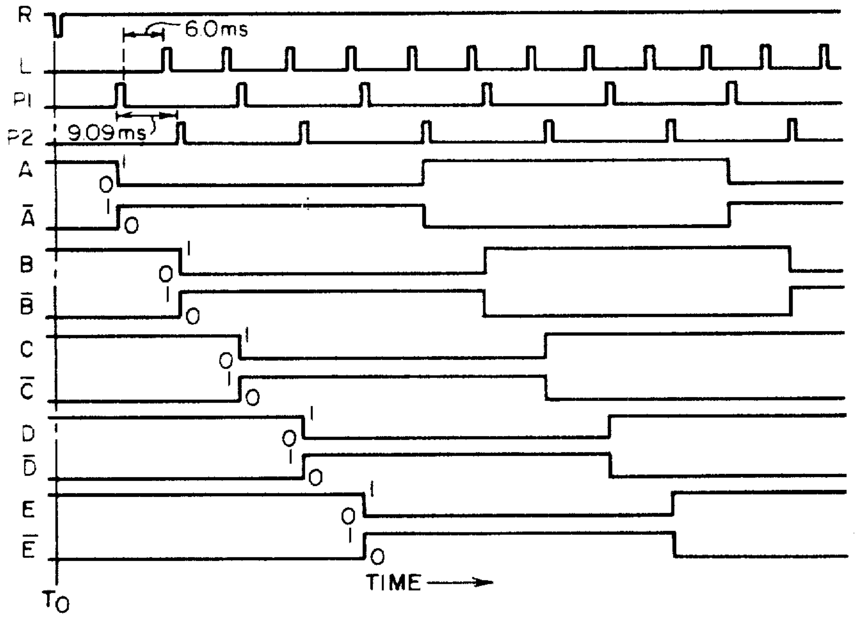
FIG. 3 shows output signals generated by a sequence counter employed in the interface system.

Reference is made to a copending application entitled "Gated Unijunction Transistor Oscillator Having Improved Periodicity," Ser. No. 537,529, filed by L. C. Vercellotti on Mar. 25, 1966, issued as U.S. Patent 3,337,816 on Aug. 22, 1967, and assigned to the present assignee, wherein there is disclosed gated unijunction transistor oscillator circuitry useful in the present application. Preferably, the unijunction transistor oscillator 36 is a two-phase oscillator similar to one of the embodiments described in the copending application, and successive substantially equally spaced clock pulses P1 and P2 are generated after oscillator turn-on as shown in FIG. 3.

The sequencer 38 is conventionally arranged to be stepped by the two-phase clock output, and it preferably includes five stages. After oscillator start-up, output signals are generated in time sequence at various output terminals of the sequencer 38 as designated alphabetically in FIG. 3. Pairs of sequencer signals are logically combined to identify successive bit times in each period of oscillator operation as follows:

| Sequence step: | Bit time |
|---|---|
| $E\cdot A$ | Start |
| $\bar{A}\cdot B$ | 1 |
| $\bar{B}\cdot C$ | 2 |
| $\bar{C}\cdot D$ | 3 |
| $\bar{D}\cdot E$ | 4 |
| $\bar{E}\cdot\bar{A}$ | 5 |
| $A\cdot\bar{B}$ | 6 |
| $B\cdot\bar{C}$ | 7 |
| $C\cdot\bar{D}$ | 8 |
| $D\cdot\bar{E}$ | Stop |

The sequencer bit time signals are used in the input operating mode to gate serial data bits received from the teletypewriter 14 into respective parallel elements in the buffer register 32 as the oscillator 36 steps the sequencer 38 during a gated period of clock operation. Use is also made of the sequencer bit time signals to scan the parallel buffer register 32 for serial transmission of the register data bits to the teletypewriter 14 during a gated period of clock operation in the output operating mode of the interface system 10.

The paired sequencer bit time outputs operate as data bit routing signals in respective register input logic circuits (for simplification, only two of eight logic circuits included are shown). Each logic circuit includes a data input AND circuit 40, and successive teletypewriter generated data bits received from a register input amplifier 42 are gated through the AND circuits 40 in sequence as the successive paired data bit time signals are generated during the input mode of interface system operation. To store the gated input bits for ultimate transfer to the computer 12, the respective AND circuits 40 are coupled to the respective storage elements in the buffer register 32 through respective data input OR circuits 44.

Data output AND circuits 46 (again only two are shown) are respectively coupled to the outputs of the respective register elements, and during the output mode of interface system operation and AND circuits 46 are sequentially gated by the paired sequencer bit time signals to transmit data bits from the buffer register 32 through a data output OR circuit 48 to a line relay driver 50. In turn, the relay 24 is sequentially energized or not energized to operate the contact 16 in the line 20 and thereby operate the teletypewriter 14 for print out or the like.

The mode control circuitry 39 includes an input mode switch 52, preferably provided in the form of a conventional bistable solid state circuit. In the input mode of interface system operation, the switch 52 is initially in its reset state or is driven to its reset state by a signal generated by a suitable time delay circuit 55 shortly after the start of each stop signal $D\cdot\bar{E}$ in each operating period of the sequencer 38.

With the start of teletypewriter operation, the line start signal at the beginning of the first serially transmitted character is a space resulting in deenergization of the relay 18 to open a contact 19 and generate a set signal at the output of an input coupling AND circuit 56. The set signal in turn is coupled to the input mode switch 52 which is switched to its set state to apply a signal to a clock gating OR circuit 59. The oscillator 36 in turn is started by the output of the OR circuit 59 and continues its operation until the switch 52 is reset by the stop circuit 55. When the clock gating signal is first generated by the OR circuit 59, a suitable one shot multivibrator 63 generates an output signal R (FIG. 3) to assure startup of the sequencer 38 in its start bit time output state $E\cdot A$. During the clock operating time, the input mode switch 52 clamps or inhibits the relay driver 50 against output operation as indicated by the reference character 53.

The clock pulses P1 and P2 are time spaced by 9.09 milliseconds to be generated in synchronism with the serial teletypewriter bits generated after the line start bit in the ongoing word time. The sequencer 38 is stepped from its start state $E \cdot A$ by the clock oscillator pulses P1 and P2 as previously described to allow the serial teletypewriter bits to be registered in parallel in the buffer register 32.

To produce synchronous data inputting, the oscillator 32 and the relay contact 19 are both coupled to the input amplifier 42. The oscillator coupling is made through a conventional unijunction time delay circuit 41 which generates an input load pulse L (FIG. 3) at an amplifier input junction 72 about 6.0 milliseconds after each clock pulse P1 and P2 to allow ample time for teletypewriter input coupling circuit operation during each bit time interval. A pulse is generated at amplifier output junction 58 for entry in the buffer register 32 only if the contact 19 is in the normally opened or spaced state during the generation of each load pulse L. In each bit time of the binary word time, the amplifier 42 thus cooperates in producing a logical AND function since a voltage signal occurs at the junction 58 if a space bit is being inputted and no voltage signal appears at the junction 58 if a mark bit is being inputted. The successive bits are routed to respective parallel register elements through the data input AND circuit 40 as the sequencer 38 sequentially generates the bit time gating signals as previously described.

At the end of the eighth bit time in the binary word time, the stop signal $D \cdot \overline{E}$ is generated by the sequencer 38 to operate the input interrupt circuit 30. The computer 12 immediately generates an input data pulse on an input data transfer control line 54 to energize computer input coupling circuitry preferably in the form of ground isolating transformer circuitry 60 and thereby transfer the parallel data from the buffer register 32 to the computer input register. The input mode switch 52 is then reset by the stop circuit 55 to terminate the gated operating period of the oscillator 36 which rests as the two line stop marks are generated prior to transmission of the next teletypewriter character.

To clear the register 32 before the next character is transmitted by the teletypewriter 14, signal C is generated by an OR circuit 57 after the data has been transferred from the register 32 to the computer 12. Thus, a time delay circuit 37 is connected between the line 54 and the OR clear circuit 57 and is arranged to effect register clearance with suitable time delay after the input data pulse is generated by the computer 12 on the line 54.

When the start signal of the next serial teletypewriter character is generated on the line 20, the input mode switch 52 is again set. Accordingly, the next gated period of oscillator operation is started to enter a new data word into the register 32. When the sequencer signal $D \cdot \overline{E}$ is again generated, a data input pulse on the line 54 transfers data to the computer 12 and the register 32 is then cleared and the stop circuit 55 resets the input mode switch 52. Input interface operation continues repeatedly until the teletypewriter transmission terminates.

When computer data words are to be printed out by the teletypewriter 14, an output data pulse is generated on an output mode select line 62 to set an output mode switch 64 in the mode control circuitry 39. The switch 64 can also be in the form of a conventional bistable solid state circuit, and when set it generates a signal which causes the oscillator gating OR circuit 59 to start a gated period of operation of the oscillator 36 and to initiate reset of the sequencer 38. Simultaneously, the input coupling AND circuit 56 is disabled by inhibit line 66 to prevent inputting. Further, the output data pulse energizes output coupling circuitry connected between the computer output register and the buffer register 32 and simultaneously transfers all of the parallel bits in the computer output data word to the register 32 through the data input OR circuits 44. Preferably, the output coupling circuitry is in the form of ground isolating transformer circuitry 68.

As the oscillator 36 steps the sequencer 38, a start bit is generated on the line 20 and the parallel stored data bits in the register 32 are sequentially transferred to the line 20 through the data output OR circuit 48 which operates the teletypewriter 14 serially through the driver 50 and the relay 24 and its contact 16. At the end of the last bit time in the computer originated character, the sequencer 38 generates the stop signal $D \cdot \overline{E}$ as in the input mode of operation. However, in the output mode a time delay circuit 51, not inhibited by line 53 as it is in the input mode, generates a signal 18.18 milliseconds after the start of the stop signal $D \cdot \overline{E}$. The output interrupt circuit 28 is then operated by the circuit 51 to signal the computer 12 that the last stop mark of the previous character has been transmitted to the line 20 and that the buffer register 32 has been cleared for the next character entry. The $D \cdot \overline{E}$ stop signal also operates through a time delay circuit 61 to reset the output mode switch 64 before a new data word entry in the register.

In the output mode, register clearance is again achieved by the OR clear circuit 57. In this instance, an AND circuit 71, operated by the sequencer stop signal $D \cdot \overline{E}$ and an output mode signal from the output switch 64, initiates the OR circuit clear signal C immediately after transmission of buffer data to the line 20 and well before generation of the next computer output data pulse on the line 62 and hence well before entry of a new word into the register 32. With successive operations of the output mode line 62, the output interfacing operation is repeated. Characters are thus transmitted from the computer 12 to the teletypewriter 14 until the print out is stopped by an operator or by the programmed computer 12.

Figure 2:
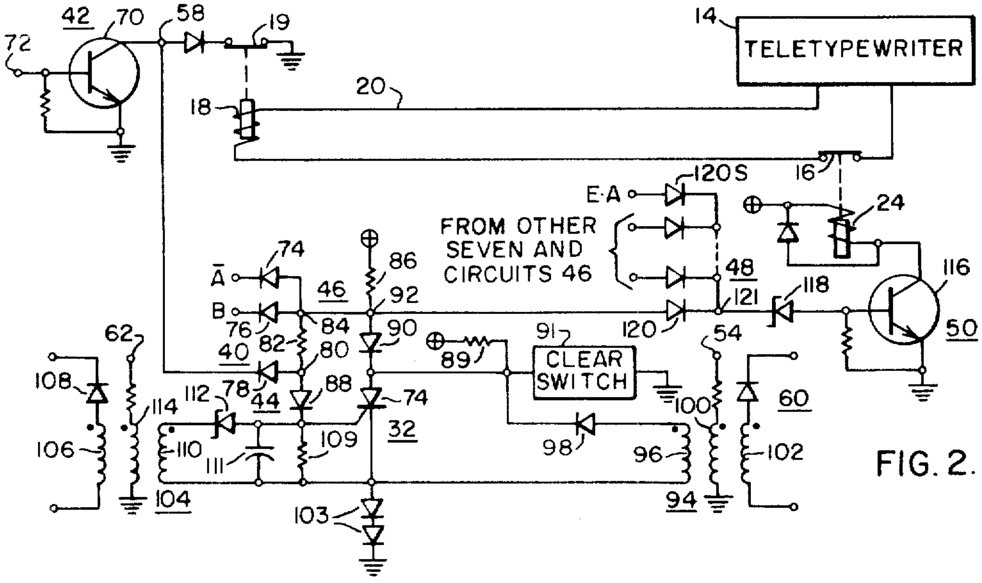
FIG. 2 shows portions of the interface system of FIG. 1 in greater circuit detail.

In FIG. 2, portions of the interface system 10 are shown in greater detail. The register input amplifier 42 preferably comprises a grounded emitter transistor 70 having its input terminal 72 suitably coupled to the unijunction transistor clock pulse delay circuit 41. The transistor 70 is normally conductive and has a collector terminal which forms the junction 58.

After the oscillator 36 has been started in the input mode of operation, the successive pulses L in the successive bit times are applied to the base emitter circuit successively to drive the transistor 70 from its normal conductive state into a non-conductive state. When the transistor 70 is non-conductive the potential at the junction 58 is high (space) if the relay contact 19 is open and it is low (mark) if the relay contact 19 is closed. Hence, an AND function is performed on the clock load pulse L and the input line signal in each bit time to determine the binary state of the junction 58. In turn, the data bit at the junction 58 in each data bit time is routed to the appropriate register element by the sequential counter data bit time signals. Start and stop bits have no effect on the register operation since the start and stop bit time signals are not coupled to the register 32. In the output interface system operating mode, a suitable clamping circuit (not shown) can be applied to the base of the transistor 70 to hold the transistor 70 in a conductive state and thereby inhibit inputting.

In its preferred form, the buffer register 32 includes eight storage elements preferably in the form of silicon controlled rectifiers or thyristors 74. Only one of the thyristors 74 and its associated input and output logic circuitry is illustrated in FIG. 2 since the other seven thyristors and associated input and output logic circuitry are identically arranged. The illustrated thyristor 74 is a storage element provided for registering a bit which occurs in the first data bit time of any input period of operation as indicated in the previously indicated table. The other thyristor elements are respectively assigned to the remaining seven data bit times.

The AND circuit 40 is provided in the form of a diode AND circuit, and it is accordingly provided with respective diodes 74, 76 and 78 respectively reverse connected between the $\bar{A}$ and B counter outputs and the junction 58 to a thyristor gating junction 80. A resistor 82, connected between the junction 80 and a junction 84 at the output of the counter diodes 74 and 76 junction 80, drops the voltage supplied by a suitable power supply through a resistor 86 to a level usable in gating the thyristor 74.

The OR circuit 44 forms a gating circuit for the thyristor 74 in both modes of interface system operation. In the input mode, the thyristor 74 is either gated or not gated by current flow through an OR diode 88 depending upon the potential at the junction 80 at the output of the register input AND circuit 40. Thus, in the first data bit time defined by $\bar{A}\cdot B$, high voltage at the junction 80 gates the thyristor 74 if the voltage at the junction 58 is high (space). Current flow from the power supply through a holding resistor 89 then holds the thyristor 74 in a latched on condition. At this point in the description, it is noted that the counter diodes 74 and 76 also cooperate with the diode 90 in forming the AND circuit 46 which is operative in the output mode of interface system operation.

During the synchronous register entry of a serial data word from the line 20 in the input mode of operation, each of the eight thyristors 74 is either set (space) or not set (mark) in the bit time assigned to it depending upon the bit content of the data word. After the serial word has been parallel registered, the computer input data pulse is generated on the line 54 to transfer the buffer data to the computer input register through the input transformer circuitry 60.

In the circuitry 60, a separate transformer 94 is associated with each thyristor 74, and it includes a sense winding 96 connected across the anode and cathode terminals of the associated thyristor 74 through a back connected diode 98. A transformer winding 100 is connected to the line 54, and an output winding 102 is coupled to a corresponding storage element in the computer input register.

The input data pulse generated on the line 54 following an input computer interrupt is applied across the winding 100 and a voltage signal is generated across the output transformer winding 102 to register a 1 bit (mark) if the thyristor 74 is not set (non-conducting). If the thyristor is set (conducting), no signal appears across the output winding 102 because the shorted sense winding 96 prevents an energy coupling between the winding 100 and the output winding 102. Since the line 54 energizes the select windings 100 in all of the transformers 94 simultaneously, parallel data bits in the buffer register 32 are simultaneously transferred to the computer input register near the end of each character input time period.

In order to clear the register 32 after each transfer of buffer data to the computer input register, a switch 91 such as a transistor is commonly used with all thyristors and operated by the signal C (FIG. 1) to remove holding current from any of the thyristors 74 which may have been set. All of the thyristors 74 are accordingly placed in a non-conductive state for acceptance of the next input mode data word registration. A plurality of diodes 103 can be connected between the thyristor cathode and ground to assure holding current diversion through the clear switch 91 when it is made conductive.

In the output mode of operation, each thyristor 74 is gated and set if a 1 (mark) bit is sensed in its corresponding element in the parallel computer output register. A separate transformer 104 couples the OR gating circuit 44 of each thyristor 74 with the computer output register for the output mode data transfer. The transformer 104 is provided with a sense winding 106 connected in series with a back connected diode 108 and the associated output of the computer output register. Further, an output winding 110 is connected in series with a Zener OR diode 112 in the OR thyristor gating circuit 44 with input gating signals filtered by a resistor 109 and a capacitor 111.

When an output data pulse is generated across transformer winding 114 following an output computer interrupt, a voltage signal is induced in the output winding 110 to gate and set the thyristor 74 if the associated computer output register element is in a logic 1 state. If the associated computer output register element is in a logic 0 state, the sense winding 106 is substantially shorted and prevents energy coupling between the winding 114 and the output winding 110 and the thyristor 74 remains non-conductive. As the thyristors 74 in the buffer register 32 become conductive or remain non-conductive upon data transfer from the computer output register, the gated unijunction transistor oscillator 36 is started by operation of the output mode switch 64 and the sequencer 38 is stepped through its count to transfer the data bits stored in the buffer register thyristors 74 to the teletypewriter 14.

If the illustrated thyristor 74 is set during its assigned number one data bit time, the junction 92 is at a low potential since the associated diodes 74 and 76 in the AND circuit 46 are then back biased. Base emitter drive voltage is accordingly withheld from a line relay driver transistor 116 by an OR diode 120 connected between the junction 92 and an OR junction 121. The line relay 24 is thus not energized and the normally closed contact 16 makes a mark on the line 20.

If the thyristor 74 is non-conductive to cause the junction 92 to be at a high potential during its assigned data bit time, the potential at the OR junction 121 exceeds the threshold value of Zener diode 118 and the OR diode 120 conducts current to drive the line relay driver transistor 116 to a conductive state. The relay coil 24 is thus energized and the contact 16 is opened to make a space on the line 20.

It follows that a logic 1 in the computer output register causes the illustrated thyristor 74 to be set and ultimately results in the transmittal of a mark in the line 20. Similarly, a logic 0 in the computer output register is ultimately transmitted to the line 20 as a space. All of the thyristors 74 are coupled to the relay drive transistor 116 through the register output OR circuit 48, i.e. through respective OR diodes 120. Accordingly, after the parallel computer output register data is transferred to the buffer register thyristors 74, the buffer data in turn is sequentially transferred to the line 20 through energization or deenergization of the output relay 24 as the OR diodes 120 become conductive or not conductive in the successive data bit times measured by the sequencer 38.

A start signal is generated on the line 20 in the output mode by connecting the sequencer start output $E\cdot A$ through an OR diode 120S in the OR circuit 48. The relay 24 is thus energized during the start bit time defined by $E\cdot A$ and *a* space is entered on the line 20. The two stop marks at the end of each output character are entered on the line 20 simply by allowing the driver transistor 116 to remain nonconductive in the last two stop bit times. Recycling of the sequencer 38 terminates the last stop mark and initiates the start space for a new character.

To prevent the output relay 24 from affecting interface system operation in the input operating mode, the driver transistor 116 can be inhibited as by connection of an inhibit transistor switch (not shown) in its collector-emitter circuit. The inhibit switch is then controlled as indicated at 53 in FIG. 1. After a data word has been removed from the thyristors 74 in the output mode, the register 32 is cleared by the switch 91 similarly to the described input mode clearance.

In summary, the system 10 operates efficiently to produce improved manufacture and use economy for data interfacing applications. A buffer register 32 is commonly operative to provide two way data processing between relatively slow serially operated equipment and fast digital equipment such as a digital computer. A gated clock system 34 is controlled to interact with the register 32 and provide for synchronous transmission and reception of digital data to and from the peripheral equipment. Preferably, the buffer register 32 is a thyristor register with relatively minimal use of separate input and output circuits for the respective register inputting and outputting operations. Excellent interfacing utility is realized in applications where the fast digital equipment is a computer and the peripheral equipment is a communication device such as a teletypewriter.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. An interface system for transferring data between a data processing system and a serially operated peripheral device having input and output transfer lines with respective bistable coupling elements therein, said interface system comprising a buffer register having a group of electronic storage elements for parallel storage of data bits representing a character, an electronic clock system coupled with said buffer register and synchronously operable with the peripheral device, electronic circuit means for synchronously directing input serial character bits from the input transfer line of the peripheral device to said character storage elements during system input operation and during gated operation of said clock system, means for transferring in parallel input character bits from said character storage elements to the data processing system during system input operation, means for transferring in parallel output character bits from the data processing system to said character storage elements during system output operation, electronic circuit means for synchronously directing output character bits from said character storage elements to the output transfer line of the peripheral device during system output operation and during gated operation of said clock system, means for controlling said clock system and said directing and transferring means in the input operating mode and the output operating mode, and means for clearing said buffer register after each character removal therefrom.

2. An interface system as set forth in claim 1 wherein said clock system includes a unijunction transistor oscillator, said controlling means starts said oscillator for each character input into said buffer register from the peripheral device and stops said oscillator after each character input into said buffer register from the peripheral device, and said controlling means starts said oscillator for each character output to the peripheral device from said buffer register and stops said oscillator after each character output to the peripheral device from said buffer register.

3. An interface system as set forth in claim 2 wherein said clock system includes a sequencer responsive to said oscillator to sequence input character bits from the peripheral device to said buffer register and to sequence output character bits from said buffer register to the peripheral device.

4. An interface system as set forth in claim 3 wherein the peripheral device is a teletypewriter and the data processing system is a digital computer having input and output registers, said directing means includes means for coupling the teletypewriter to said buffer register for two way data flow, said transferring means includes means for coupling the computer registers to said buffer register for two way data flow, and said controlling means controls the direction of data flow between said buffer register and the teletypewriter and the computer.

5. An interface system as set forth in claim 2 wherein said buffer register storage elements are thyristors each having a predetermined bit assignment in processed characters, said input directing means and said output transferring means together include respective means for gating said thyristors for entry of character bits into said buffer register, said output directing means and said input transferring means include respective means responsive to the state of said thyristors for sensing character bits in said buffer register, means responsive to said clock system are provided for sequentially enabling the operation of said gating means during entry of respective character bits from the peripheral device, means responsive to said clock system are provided for sequentially enabling the operation of said sensing means during transfer of character bits from said buffer register to the peripheral device, and said clearing means includes means for driving said thyristors to a non-conductive state after each character removal from said buffer register.

6. An interface system as set forth in claim 5 wherein each of said gating means includes a gating OR circuit, said gating OR circuits are respectively coupled to the data processing system said clock system further includes a sequencer responsive to said oscillator to generate sequential output signals, and an AND circuit couples each of said gating OR circuits with said sequencer and the input transfer line of the peripheral device.

7. An interface system as set forth in claim 5 wherein each of said sensing means includes a sensing OR element responsive to the associated thyristor anode potential, said clock system further includes a sequencer responsive to said oscillator to generate sequential output signals, respective AND circuits respectively include said sensing OR elements and are coupled to said sequencer, a sensing OR junction commonly connects said sensing OR elements and is coupled to the output transfer line of the peripheral device, and each of said sensing means further includes means responsive to the associated thyristor anode potential for coupling input character bits to the data processing system.

8. An interface system as set forth in claim 7 wherein each of said gating means includes a gating OR circuit, said gating OR circuits respectively are coupled to the data processing system, an AND circuit couples each of said gating OR circuits with said sequencer and the input transfer line of the peripheral device, and said AND circuits associated with each thyristor include common sequencer coupling circuit elements.

9. An interface system as set forth in claim 8 wherein the peripheral device is a teletypewriter and the data processing system is a digital computer having input and output registers, and said direcing means include respective relays for coupling the teletypewriter input and output transfer lines respectively to the gating and sensing OR circuits.

10. An interface system as set forth in claim 4 wherein said controlling means includes computer interrupt means responsive to said sequencer to initiate two way data transfer between said buffer register and the computer.

11. An interface system as set forth in claim 4 wherein said controlling means includes an input mode switch and an output mode switch coupled to said oscillator, respective means for operating said switches to start said oscillator in the respective operating modes, respective means responsive to said sequencer for operating said switches to stop said oscillator in the respective operating modes, and said data flow direction controlling means is responsive to said input and output switches.

12. An interface system as set forth in claim 6 wherein an input circuit is coupled to said oscillator and the input transfer line of the peripheral device, and said AND circuits are connected to an output of said input circuit.

References Cited

UNITED STATES PATENTS 3,333,253 7/1967 Sahulka ---------- 340—172.5

(Other references on following page)

UNITED STATES PATENTS

| | | | |
|---|---|---|---|
| 3,312,945 | 4/1967 | Berezin et al. | 340—172.5 |
| 3,293,613 | 12/1966 | Gabor | 340—172.5 |
| 3,274,564 | 9/1966 | Binder et al. | 340—172.5 |
| 3,249,924 | 5/1966 | Furlong | 340—172.5 |
| 3,246,300 | 4/1966 | Apple et al. | 340—172.5 |
| 3,209,331 | 9/1965 | Arnold et al. | 340—172.5 |
| 3,117,306 | 1/1964 | Reitfort | 340—172.5 |
| 3,090,034 | 5/1963 | Fredericks et al. | 340—172.5 |
| 3,051,929 | 8/1962 | Smith | 340—172.5 |
| 3,032,746 | 5/1962 | Kautz | 340—172.5 |
| 3,029,412 | 4/1962 | Southard | 340—172.5 |
| 2,989,731 | 6/1961 | Albanes | 340—172.5 |
| 2,985,865 | 5/1961 | Merz | 340—172.5 |
| 2,968,791 | 1/1961 | Johnson et al. | 340—172.5 |
| 2,929,556 | 3/1960 | Hawkins et al. | 235—155 |
| 2,905,930 | 9/1959 | Golden | 340—174 |
| 2,872,665 | 2/1959 | Townsend et al. | 340—174 |

GARETH D. SHAW, *Primary Examiner.*